United States Patent Office

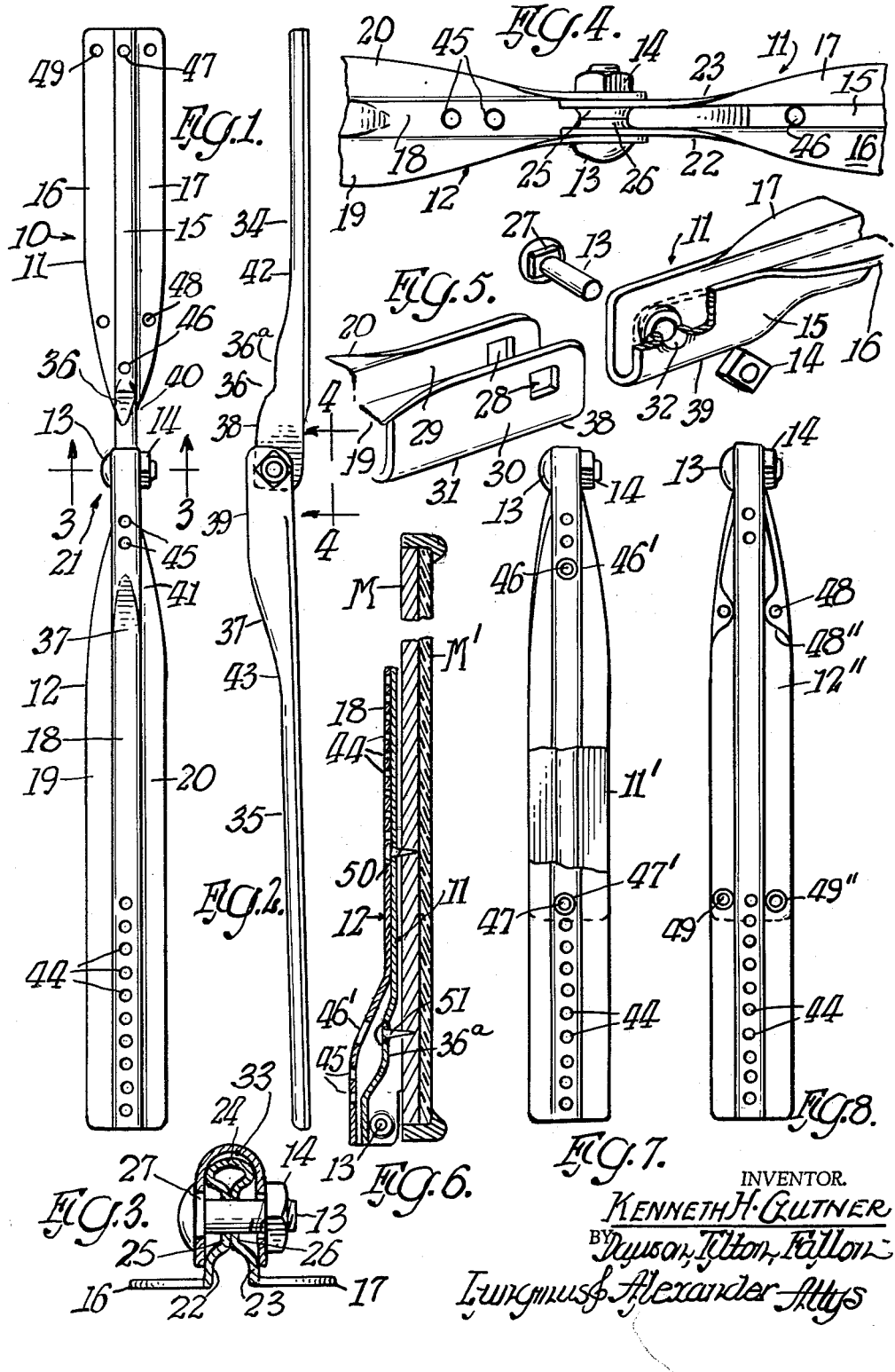

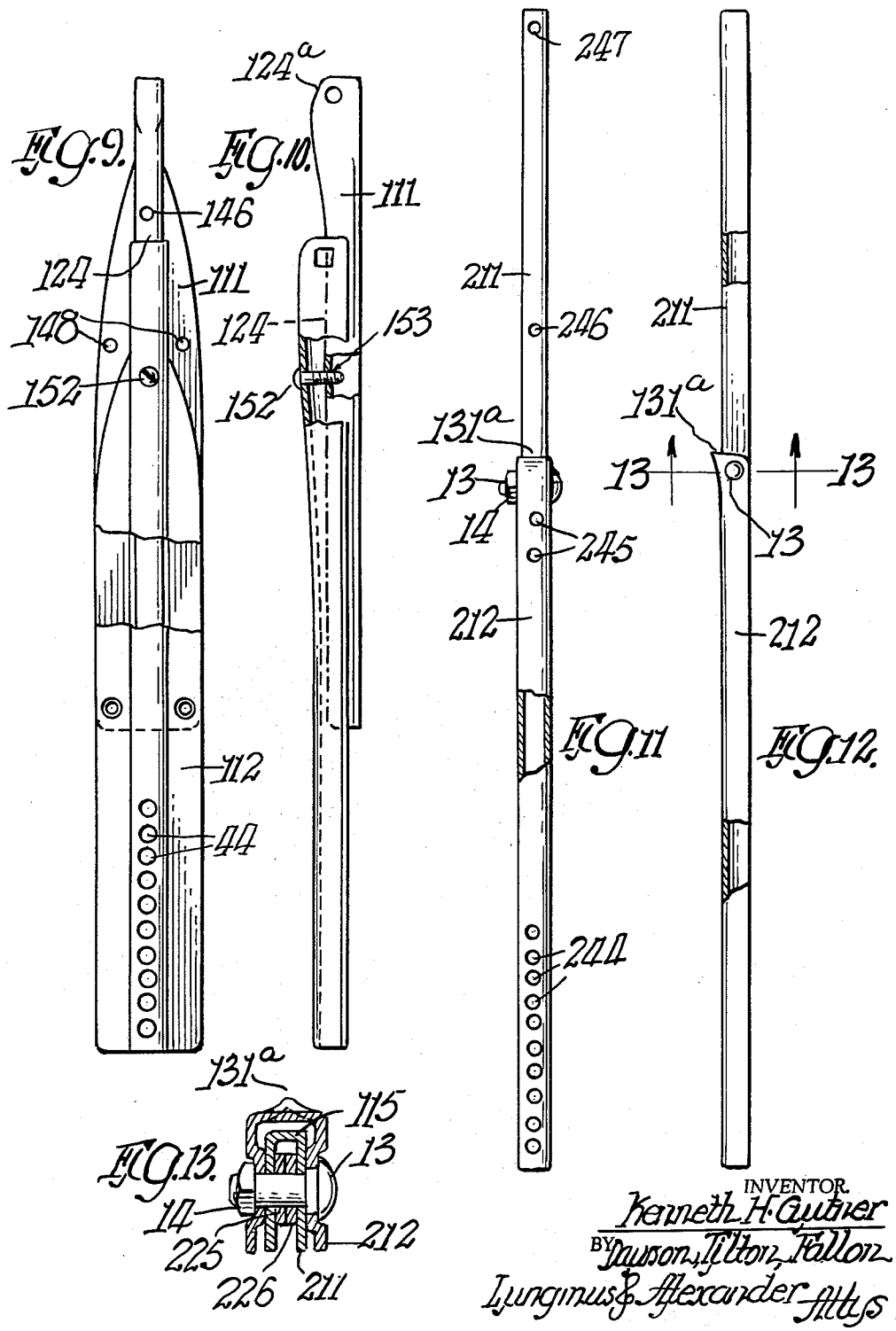

3,178,137
Patented Apr. 13, 1965

3,178,137
MIRROR MOUNTING BRACKET
Kenneth H. Gutner, 3285 Dato, Highland Park, Ill.
Filed May 9, 1963, Ser. No. 279,097
15 Claims. (Cl. 248—28)

This invention relates to a mirror mounting bracket, and, more particularly, to a two-piece element adapted to secure a mirror in pivotal fashion above a dresser, or the like, and wherein the pieces are adapted to be positioned in a variety of relations in different stages of handling and use.

It is a general object of this invention to provide a novel mirror bracket adapted to support a mirror in pivotal fashion above a dresser, wherein the elements making up the bracket are uniquely constructed to provide advantages in manufacture, shipment, final installation, and use.

Here, it should be appreciated that a mirror-equipped dresser is not shipped as such, either from the manufacturer to the dealer, or from the dealer to the ultimate consumer. Thus, there is a problem of supplying the mirror-supporting bracket which has been met with indifferent success in the past. In some cases, the bracket components have merely been put in a dresser drawer, with the attendant possibility of loss and damage to the drawer interior. In other cases, the mirror bracket has been shipped separately, which gives rise to the possibility of improper installation. These drawbacks are specifically solved by the instant invention.

Another object of the invention is to provide a novel mirror bracket and resultant furniture assembly characterized by extremely rugged yet simple construction which makes it possible to install a mirror in pivotal fashion on a dresser of even relatively inexpensive construction which heretofore could not justify departure from rigid wood braces.

Still another object is to provide a mirror-supporting bracket characterized by novel structural features which insure proper performance, i.e., the mirror tilt, once established, remains until intentionally changed.

Other objects and advantages of the invention may be seen in the details of construction and operation set down in this specification.

The invention is described in conjunction with the accompanying drawing, in which—

FIG. 1 is a rear elevational view of the inventive bracket in the form it assumes when installed on the rear of a dresser and mirror, i.e., the shorter member being adapted to be secured to a mirror, while the longer member is secured to the rear of a dresser, this view showing the bracket as it would be viewed from the rear of the mirror-equipped dresser;

FIG. 2 is a side elevational view of the bracket of FIG. 1;

FIG. 3 is an enlarged, sectional view such as would be seen along the sight line 3—3 applied to FIG. 1;

FIG. 4 is an enlarged front elevational view, in fragmentary form, such as would be seen from the vantage line illustrated as 4—4 in FIG. 2;

FIG. 5 is an exploded fragmentary perspective view, partially cut away, of the pivotal portion of the device as seen in the preceding views, particularly FIG. 3;

FIG. 6 is a fragmentary side elevational view, partially in section, of the inventive bracket applied to a mirror as it would be in one form during shipment to a dealer or ultimate consumer;

FIG. 7 is a rear elevational view of a modified assembly of two elements which is useful for transshipment between the bracket manufacturer and furniture manufacturer, the elements being assembled in nested relation adapted to be secured as such to the rear of a mirror as generally seen in FIG. 6;

FIG. 8 is a rear elevational view of another assembly and corresponding generally to the showing of FIG. 7;

FIGS. 9 and 10 are views similar to FIGS. 7 and 8 but showing another nested arrangement;

FIGS. 11 and 12 are views similar to FIGS. 1 and 2 but showing a modified form of bracket; and FIG. 13 is an enlarged sectional view taken along the line 13—13 of FIG. 12.

Referring now to FIG. 1, the numeral 10 designates generally the inventive mirror bracket, which is seen to include an elongated mirror member 11, an elongated dresser member 12, a bolt 13, and a nut 14. In the illustration given, the mirror member 11 is shorter than the dresser member 12, but this may be varied according to a particular installation.

The mirror member 11 is seen to include a centrally transversely disposed, longitudinally-extending rib 15 upstanding from generally coplanar, laterally-extending side flanges 16 and 17.

In similar fashion, the dresser member 12 includes a longitudinally-extending, centrally-disposed rib 18 with elongated, laterally-extending, generally coplanar side flanges 19 and 20.

As can be appreciated from FIGS. 1–5, particularly FIGS. 3 and 4, the U-shaped rib 15 is received within the U-shaped rib 18 at the area of pivotal interconnection 21 of the members 11 and 12. For this purpose, the rib 15 is narrower than the rib 18. This permits both the partial nested relation of the two members 11 and 12 as seen in FIGS. 1 and 2 and also the full nested relation shown in FIGS. 6–8. To meet both the requirements of strength and economy, I find it advantageous to construct the members 11 and 12 of 16 or 18 gauge steel. Thus, the dimensions can be controlled to provide the different nested assemblies.

As seen best in FIG. 3, the rib 15 is defined by side walls 22 and 23 and a top wall 24. Each side wall 23 and 24 is equipped with an embossed area as at 25 and 26, respectively, the embossed or indented portion 25 being seen in perspective form in FIG. 5. The indented portions 25 and 26 are in contacting relation as seen in FIGS. 3 and 4 and thus serve to limit any tendency of side walls 22 and 23 of the rib 15 to become distorted, particularly under the compressive influence of the bolt assembly made up of bolt 13 and nut 14.

In this connection, it is to be noted that the bolt 13 is equipped with a square shoulder or shank as at 27 which fits into a correspondingly contoured opening 28 (see FIG. 5) in the rib 18 of the dresser member 12. The rib 18 is defined by side walls 29 and 30 and top wall 31, with each side wall 29 and 30 being equipped in the illustration given with a square opening 28 so that the bolt 13 may be inserted from either side. In similar fashion, the walls 22 and 23 of the rib 15 are equipped with aligned circular openings 32. The openings 32 are spaced further above the flanges 16 and 17 of the mirror member 11 than the openings 28 relative to the flanges 19 and 20 of the dresser member 12, thereby affording a space as at 33 (see FIG. 3) to permit pivoting of one member relative to the other.

As can be clearly appreciated from a consideration of FIGS. 2 and 5, the ribs 15 and 18 in the vicinity of the pivotal joint 21 are higher than the rest of the associated rib, the rib in each case for this purpose being defined by: a substantially uniform portion 34 and 35 relative to members 11 and 12, respectively (see FIG. 2) extending over a substantial length of each member; an upwardly tapered portion as at 36 and 37 to provide an increasing height in the ribs 15 and 18, respectively; and a uniform portion of substantial height adjacent the pivot ends as at 38 and 39. As can be appreciated from a consideration of FIG. 5, the highest rib portions 38 and 39 are of uniform height and are immediately adjacent the pivot end of each member and are essentially defined by the portion of the ribs 15 and 18 lying between the pivot end of the member and the point at which the side flanges 16 and 17, or 19 and 20, as the case may be, terminate as at 40 and 41 (see also FIGS. 1 and 2).

The flanges 16 and 17 of member 11, and 19 and 20 of member 12, are seen to be outwardly tapered in proceeding away from the pivot end, and reach maximum width at about the position where each rib, 15 or 18, as the case may be, becomes uniform in height again, as at 42 and 43 in FIG. 2.

It is believed that a specific example of the invention will aid in the understanding of the geometrical construction employed, and, for that purpose, the following is set down.

Example

In one embodiment of the invention, the dresser member 12 is constructed of 16-gauge metal and stamped from 1½" wide stock, 12" long to develop a slightly rounded, U-shaped rib 18 having a width of 7/16" resulting from a die-punching operation. The element 12 has a rib pivot end portion 39 which is 2¼" long and 21/32" high. The intermediate rib portion 37 between the points 41 and 43 measures 2" in length. Located in the uniform lower height portion 35 of the rib 18 are ten holes 44, each 3/16" in diameter on 0.40" centers, the height of the rib portion 35 being 9/32", both height dimensions herein given being from the front faces of the flanges 19 and 20. These permit location of a securing screw in alignment with the parting rail on the dresser. Additionally, the high rib portion 39 in the member 12 is equipped with openings 45 for receiving a second securing screw (see FIG. 1) for the second point of securement to the dresser.

In the final assembly, the members 11 and 12 are arranged as seen in FIG. 1, and the nut 14 and bolt 13, respectively, employed to provide the pivotal connection. The embossed or indented portions 25 and 26 in the member 11 described herein have an outer diameter of 7/16" and an inner diameter of 5/16" to provide an annular area of contact of 1/16". The bolt opening is ¼" in diameter and has its center 7/16" above the flange front face. The square openings 28 have their centers ¼" above the front faces of the flanges 19 and 20.

The mirror member in the embodiment of this example measures 8" long, having a rib pivot end portion 38 measuring 1⅛" in length and ¾" high. The tapered rib portion 36 measures 3" in length and the lower height rib portion 34 has a height of 9/32". The mirror member 11 is equipped with two sets of screw-receiving openings—those designated 46 and 47 are provided in the top wall 24 of the rib 15 and are employed in mirrors having a normal wood trim. Those designated 48 and 49 (in the flanges 16 and 17) are used for narrow trim mirrors. For the purpose of properly seating the screw passing through opening 46, the sloping rib portion 36 may have an intermediate flat section as at 36a (seen only in FIG. 2), occupying a length of ½" commencing ⅝" from point 40, and being ½" in height.

In some instances, the furniture manufacturer may receive the elements 11 and 12 separately from the bracket manufacturer, in which case the nesting arrangement pictured in FIG. 6 is employed. In FIG. 6, it is seen that the symbol "M" designates a mirror frame constructed of wood and which provides a mounting for a mirror M'. Secured to the rear side of the mirror frame M is the mirror member 11 equipped with wood screws 50 and 51 extending through openings 46 and 47, or 48 and 49, respectively (for the location of these openings see FIG. 1). The bottom of the member 12 is approximately flush with the bottom of the mirror frame M. Thereafter, the dresser member 12 is secured to the now permanently mounted mirror member 11 by means of using the bolt 13 in the fashion seen in FIG. 3. Here, it will be appreciated that other securing bolts may be substituted for the square shouldered bolt pictured, the square shouldered bolt of the drawing being preferred, since this eliminates any possibility of bolt rotation during pivotal adjustment of the mirror relative to the dresser. The same can be achieved through the use of lock washers, and the like.

Through the use of the uniform height, high rib sections 38 and 39, I find an advantageous pivoting action afforded without reducing the strengthening character of the rib. The provision of the portions 38 and 39 in each rib makes possible a greater amount of pivotal movement than if the taper were commenced right at the pivot end of the rib.

With the inventive construction, particularly through the use of securing screws inserted through the holes 44 and 45 in the top wall 31 of the rib 18, there is provided a pivotal connection 21 which is governed essentially by the bolt 13 and nut 14 rather than by the rest of the dresser member 12. The insertion of wood screws through the holes 44 and 45 tends to spread the rib 18 slightly, and inasmuch as there is an absence of the flanges 19 and 20 in the vicinity of the pivotal connection 21, the amount of friction between the elements 11 and 12, when installed, is governed by the degree to which the bolt 14 is tightened on the screw 13. Hence, if the housewife wishes to adjust the tilt of the mirror relative to the dresser, it is only necessary to pivot the elements relative to each other, it being unnecessary to loosen the nut 14.

It will be appreciated that the embossed rib portions 25 and 26 are essentially rigid. This part, as can be appreciated from a consideration of FIG. 3, is supported on the threaded part of the bolt 13 remote from the connection with the nut 14. Therefore, pivotal action of the mirror does not result in stripping any useful threads. Further, through the use of the two brackets, one on each end of the mirror, there is provided essentially a two-point support, since the embossed portions 25 and 26 in each bracket provides a relatively small bearing area. This eliminates the possibility of binding at the pivotal joint 21, which might occur if the embossed portions 25 and 26 were omitted. In particular, the embossed portions assure proper installation, since the proper installation is clear from a first glance—definitely indicating which part goes where.

The nesting arrangements of the two members 11 and 12 as seen in FIGS. 7 and 8 may be advantageously employed when the members 11 and 12 are shipped from the bracket manufacturer to the furniture manufacturer. The showings in FIGS. 7 and 8 correspond generally to the showing in FIG. 6 wherein the mirror member 11 is wholly received in nested relation within the dresser member 12. To make possible the installation of the mirror member 11 to the mirror frame end, and without having to dis-assemble the members 11 and 12, the member 11' in FIG. 7 is equipped with access openings as at 46' and 47', which register with the openings 46 and 47 in the member 12, as seen in FIG. 1. Further, openings 46' and 47' are substantially larger than the openings 46 and 47 so as to accommodate the receipt therein of the head of a wood screw such as is shown in FIG. 6 at 50 and 51.

Where the bracket assembly 10 is to be installed on a narrow trim mirror, the openings 48 and 49 are employed for the receipt of the wood screws. To accommodate the immediate application of the nested assembly of FIG. 8 to such a narrow trim mirror, the dresser member 12" is equipped with access openings 49" in registry with, and larger than, opening 49. For the purpose of obtaining access to the opening 48 in the mirror member 10, the dresser member 12" is equipped with notched portions 48″ in the flanges 19 and 20. Here, it will be appreciated that one pair of openings 48 and 49 will be employed in one mirror member—the right-hand pair—for the right-hand mirror member, and the left-hand pair of openings for the left-hand mirror member, when the same is installed on the rear of a mirror frame.

Where a lower strength, lighter weight mirror bracket 10 can be employed, I construct the dresser member 12 of 18-gauge steel 11″ long and 1⅜″ wide. The mirror member 11, however, is still constructed of 1½″ wide stock, this, however, being 6″ long and of 18-gauge thickness. The reduction in length of the members 11 and 12 occurs in the rib portions 34 and 35, in each case the relationship of the gradually reduced height portions 36 and 37 to the maximum height portions 38 and 39 remaining the same. (In this connection, it will be seen that the length of the varying height portion 37 to the maximum height portion 38 in the mirror member 11, is in excess of 2:1, while the ratio of the rib portions 37 and 39 is about 1:1.) Also, irrespective of the gauge, the location of the openings 28 in the dresser member 12 is closer to the flanges than the location of the openings 32. This then provides the space 33, making possible substantial pivotal movement between the two members. Also, the flattened portion 36a in the rib 15 effectively countersinks the screw 50 so that the dresser member 12 can lie approximately flush with the rear of the mirror frame end—see FIG. 6.

The provision of the indented or embossed portions 25 and 26 develops an advantageous stabilization of the bolt 13. This stems from the fact that the side walls 22 and 23 of the rib 15 do not tend to spread apart, and thus resiliently act against the side walls 29 and 30, tending to exert an unseating force of the nut 14 during pivotal adjustment of the mirror M′. Also, the provision of the indented or embossed portions 25 and 26 means that the weight of the mirror is carried generally midway of the length of the bolt 13 (see FIG. 3). This is opposed by the support provided at the ends of the bolt by means of the side walls 29 and 30 of the rib 18. This tends to immobilize the bolt 13 against longitudinal movement, which could only tend to destroy the pivot support. Also, as pointed out previously, the provision of the indented portions 25 and 26 localizes any wear on the bolt threads at a point where the threads are not employed to engage the nut 14.

As seen in FIGS. 9 and 10, the brackets 111 and 112 may be secured in offsetting, nested relation. For this purpose, the dresser element 112 is secured to the mirror element 111 by means of a self-tapping screw 152 extending through an opening 153 in the upper wall 124 of the mirror member 111. When final installation is called for, the self-tapping screw 152 is removed and discarded, with the members 111 and 112 thereafter assembled in the form seen in FIGS. 1 and 2. This same configuration may be employed during transshipment of the bracket when it is attached to a mirror by virtue of securing the mirror bracket 111 to the mirror by means of screws (not shown) extending through openings 146 and 148.

An alternative form of construction of the mirror bracket is seen in FIGS. 11–13, where it is seen that the same advantageous inward contacting of the inner walls of the narrower member 211 is provided by washers 225 and 226 (see particularly FIG. 13). The washers may be secured within the rib 115, if desired. In the arrangement shown in FIGS. 11–13, both the mirror member 211 and the dresser member 212 are U-shaped in transverse section, differing from the arrangement seen in the preceding views in lacking the sidewardly-extending flanges. Further, the cross section in each member 211 and 212 is uniform in height, as can be appreciated from a consideration of FIG. 12. The elements 211 and 212, in the embodiments seen in FIGS. 11–13, are secured to the mirror and dresser, respectively, by means of openings 247 and 246 relative to the mirror element, and openings 244 and 245 relative to the dresser element.

If additional tilting movement is desired, the openings 32 in the mirror member 11 may be moved closer to the top wall 124. Alternatively, the top wall 131 of the dresser member 112 may be peaked as at 131a in FIGS. 12 and 13 and the top wall 124 of the mirror member 111 flattened as at 124a in FIG. 10.

While, in the foregoing specification, I have set down a detailed description of the invention for the purpose of explanation thereof, many variations in the details herein given may be made by those skilled in the art without departing from the spirit and scope of the invention.

I claim:

1. A mirror bracket for mounting a mirror above a dresser, comprising a pair of elongated metal members,
   each member having flat, coplanar, longitudinally-extending flanges along the longitudinal sides thereof, and a centrally disposed, longitudinally-extending, generally U-shaped rib, one of said members being adapted to be secured to a mirror and the other to a dresser,
   each flange in each member tapering inwardly toward its associated rib to provide a pivot end portion on each member free of any flange,
   the rib portion in each pivot end portion being of greater height than the remainder of the rib,
   the rib end portion in said mirror member being narrower than the rib end portion of the dresser member,
   a pair of aligned openings in each rib pivot end portion, metal means about the openings in the narrower rib for disposing the opposite sides of the narrower rib in contacting relation, and
   bolt means extending through the openings in both ribs for pivotally securing said members together.

2. The bracket of claim 1 in which each of said rib pivot end portions includes a part of uniform height at the extreme end and a part of gradually reduced height intermediate the ends of each member.

3. The bracket of claim 2 in which the ribs of said members are equipped with openings in the top walls thereof for securing said member to furniture.

4. The structure of claim 1 in which access holes are provided in said dresser member for securing said mirror member to a mirror during shipment prior to installation of the mirror on a dresser and while said mirror member is nested within said dresser member.

5. The structure of claim 1 in which said bolt means includes a square shanked bolt, and square openings in said dresser member for receiving said bolt means.

6. A mirror mounting bracket, comprising:
   first and second elongated metal members, with each member having flat, longitudinally-extending, coplanar flanges along the longitudinal sides thereof integral with a centrally-disposed, longitudinally-extending, generally U-shaped rib,
   each rib having a greater height at one end than the other, aligned openings in each rib adjacent the greater height end,
   annular portions about the openings in said first member being deformed inwardly into mutual contacting relation, the rib at said one end in said first member being thinner than the rib in said second member,
   the first member rib being received within the second member rib, and
   bolt means releasably interconnecting said first and second member ribs for pivotally connecting said members.

7. The structure of claim 6 in which said first member rib is equipped with a gradually reduced height portion adjacent to but spaced from said openings, an intermediate part of said reduced height portion being flat and generally parallel to said first member flanges, and a screw hole in said intermediate part for securing said first member to a mirror frame.

8. A mirror mounting bracket, comprising:
first and second elongated metal members, with each member having flat, longitudinally-extending, coplanar flanges along the longitudinal sides thereof integral with a centrally-disposed, longitudinally-extending, U-shaped rib,
each rib having aligned openings adjacent one end thereof,
annular portions about the openings in said first member being deformed inwardly into mutual contacting relation, the rib at said one end in said first member being thinner than the rib in said second member,
the first member rib being received within the second member rib,
bolt means releasably interconnecting said first and second member ribs, and
a plurality of wood screws securing said first member to said frame adjacent the mirror bottom edge, whereby only said second member requires repositioning for installing said mirror on a dresser.

9. The structure of claim 8 in which said wood screws extend through holes in said first member rib, said second member being equipped with rib holes adapted to pass the heads of said wood screws.

10. The structure of claim 7 in which said wood screws extend through the holes in said first member flanges, said second member having flange access openings adapted to pass the heads of said wood screws.

11. A mirror mounting bracket, comprising
first and second elongated metal members, with each member having flat, longitudinally-extending, coplanar flanges along the longitudinal sides thereof integral with a centrally-disposed, longitudinally-extending, generally U-shaped rib,
each rib having a greater height at one end than the other, aligned openings in each rib adjacent the greater height end,
annular portions about the openings in said first member being deformed inwardly into mutual contacting relation, the rib at said one end in said first member being thinner than the rib in said second member,
at least the major portion of the first member rib being received within the second member rib, and
bolt means releasably interconnecting said first and second member ribs.

12. The bracket of claim 11 in which the openings in one rib are arranged in confronting relation with the aligned openings in the other rib, said bolt means extending through said confronting openings.

13. The bracket of claim 11 in which the portion of said first member rib having the greater height extends beyond said second member one end, said bolt means comprising an elongated bolt having its length generally perpendicular to the flange planes.

14. A mirror bracket for mounting a mirror above a dresser, comprising a pair of elongated metal members each having a U shape in transverse section,
one of said members being shorter and adapted to be secured to a mirror while the other member is adapted to be secured to a dresser, said one member being narrower than the other member,
a pair of aligned openings in one end portion of each member, the metal about the openings in the narrower member being deformed to bring the opposite sides of the narrower member into contacting relation, and
bolt means extending through the openings in both members for pivotally securing said members together.

15. A mirror mounting bracket, comprising:
first and second elongated metal members, each having a U shape in transverse section, with one member being shorter and narrower than the other,
aligned openings in each member adjacent one end thereof,
annular portions about the openings in said one member being deformed inwardly into mutual contacting relation,
at least the major portion of the first member being received within the second member, and
bolt means releasably interconnecting said first and second members.

References Cited in the file of this patent
UNITED STATES PATENTS

| | | |
|---|---|---|
| 2,122,831 | Atwood | July 5, 1938 |
| 2,557,773 | Steinman | July 19, 1951 |
| 2,903,210 | Cousins | Sept. 8, 1959 |
| 3,120,937 | Gutner | Feb. 11, 1964 |

CLAUDE A. LEROY, *Primary Examiner.*